US008764526B2

(12) United States Patent
Höfler et al.

(10) Patent No.: US 8,764,526 B2
(45) Date of Patent: Jul. 1, 2014

(54) AIR DUCT SYSTEM FOR VEHICLES, IN PARTICULAR FOR RAIL VEHICLES FOR PASSENGER TRAFFIC

(75) Inventors: Werner Höfler, Krefeld (DE); Rainer Wichmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 1768 days.

(21) Appl. No.: 11/988,325

(22) PCT Filed: Jun. 13, 2006

(86) PCT No.: PCT/EP2006/063129
§ 371 (c)(1),
(2), (4) Date: Jan. 4, 2008

(87) PCT Pub. No.: WO2007/006616
PCT Pub. Date: Jan. 18, 2007

(65) Prior Publication Data
US 2009/0130967 A1    May 21, 2009

(30) Foreign Application Priority Data
Jul. 7, 2005    (DE) .......................... 10 2005 031 912

(51) Int. Cl.
*B61D 27/00*    (2006.01)
(52) U.S. Cl.
USPC ............................................. 454/83; 454/137
(58) Field of Classification Search
USPC ........................ 454/83, 292, 296, 69, 136, 137
See application file for complete search history.

(56) References Cited

U.S. PATENT DOCUMENTS

| | | | | |
|---|---|---|---|---|
| 4,303,007 A | * | 12/1981 | Riegel et al. | 454/299 |
| 5,111,739 A | * | 5/1992 | Hall | 454/306 |
| 5,399,121 A | | 3/1995 | Gray et al. | |
| 5,518,448 A | * | 5/1996 | Madoglio et al. | 454/108 |
| 6,953,369 B2 | * | 10/2005 | Sasaki et al. | 439/680 |
| 2006/0000592 A1 | * | 1/2006 | Bosquet et al. | 165/202 |
| 2006/0172676 A1 | * | 8/2006 | Ebner et al. | 454/152 |
| 2006/0207758 A1 | * | 9/2006 | Elliot et al. | 165/202 |

FOREIGN PATENT DOCUMENTS

| | | | |
|---|---|---|---|
| CH | 604 066 A5 | | 8/1978 |
| DE | 196 54 633 C1 | | 4/1998 |
| EP | 1 357 323 A1 | | 10/2003 |
| JP | 01172010 A | * | 7/1989 |
| JP | 09175148 A | * | 7/1997 |
| JP | 2003326943 A | * | 11/2003 |
| JP | 2003326943 A1 | | 11/2003 |

* cited by examiner

*Primary Examiner* — Steven B McAllister
*Assistant Examiner* — Brittany Towns
(74) *Attorney, Agent, or Firm* — Laurence A. Greenberg; Werner H. Stemer; Ralph E. Locher

(57) ABSTRACT

An air duct system for vehicles, in particular for passenger rail vehicles, has at least one roof venting duct, which has a component venting duct for warm air and a component venting duct for cold-air. A separating means which is arranged inside the roof venting duct is designed so it can be deformed or is held in a movable fashion in such a way that the cross section of each of the two component venting ducts can be enlarged by making the respective other component venting duct smaller. These changes in cross section are brought about solely by the air pressure and volume flow conditions without external energy.

6 Claims, 6 Drawing Sheets

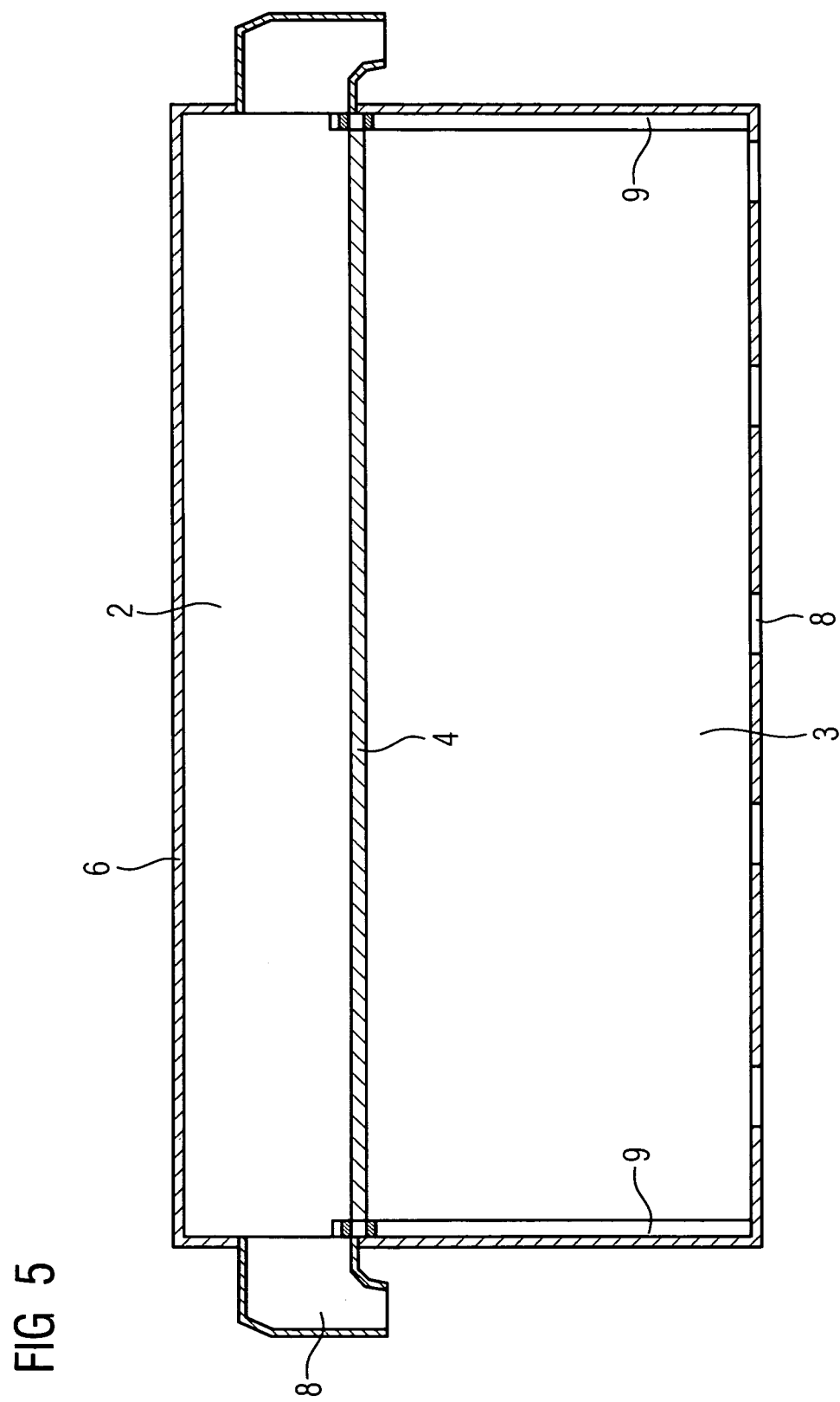

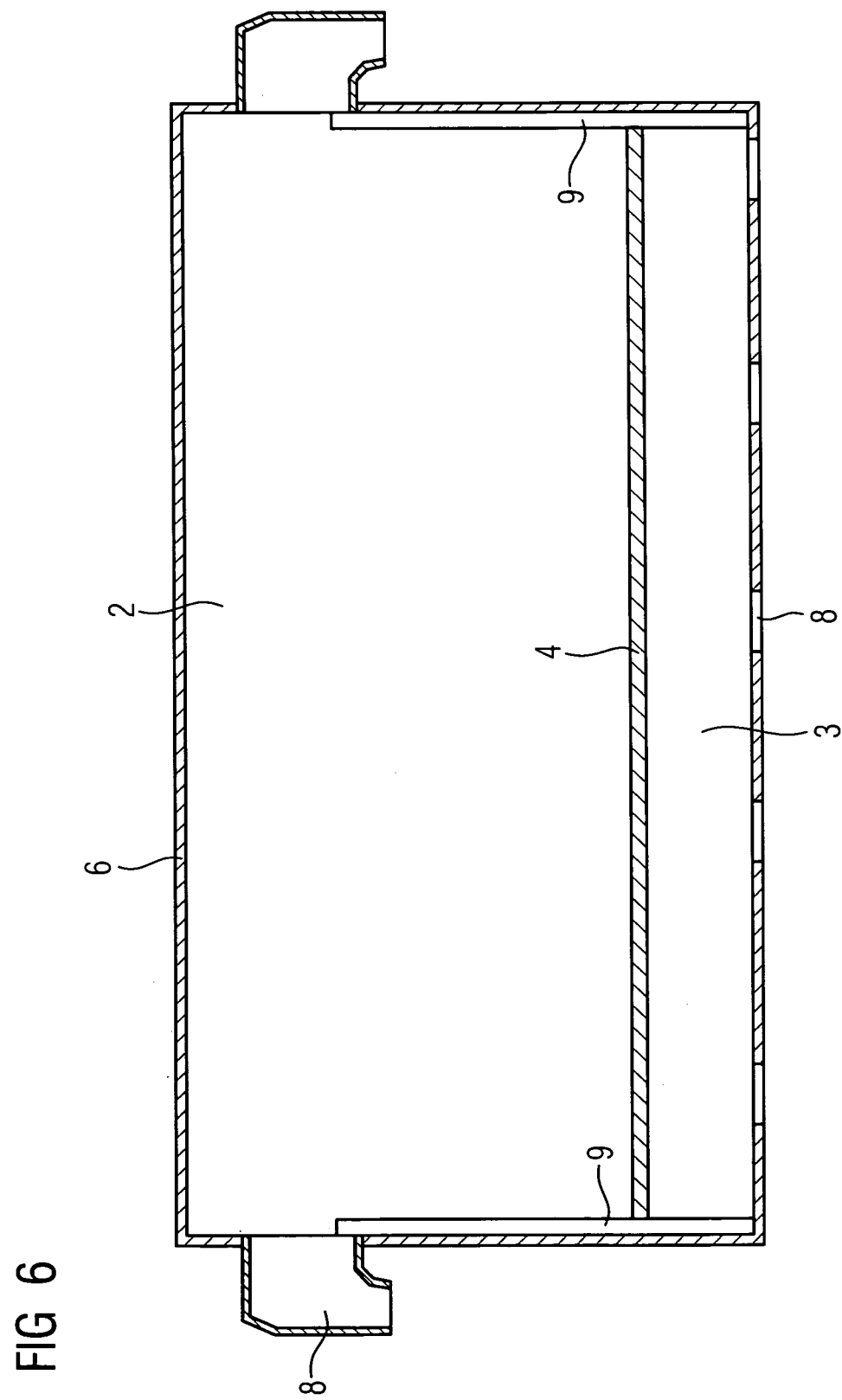

AIR DUCT SYSTEM FOR VEHICLES, IN PARTICULAR FOR RAIL VEHICLES FOR PASSENGER TRAFFIC

CROSS REFERENCE TO RELATED APPLICATIONS

This application is the US National Stage of International Application No. PCT/EP2006/063129, filed Jun. 13, 2006 and claims the benefit thereof. The International Application claims the benefits of German application No. 10 2005 031 912.2 filed Jul. 7, 2005, both of the applications are incorporated by reference herein in their entirety.

FIELD OF INVENTION

The invention relates to an air duct system for vehicles, in particular for rail vehicles for passenger traffic, having at least one roof venting duct which has a component venting duct for warm air and a component venting duct for cold air.

BACKGROUND OF THE INVENTION

Devices for distributing air are generally known in air conditioned rail vehicles with air conditioning systems which are mounted in the roof area. In these devices, the treated air is fed from the air conditioning system, frequently arranged on the roof of the vehicle, to main venting ducts using air feed ducts, said main venting ducts being located between the roof and the inner ceiling of the vehicle. These air feed ducts lead from the air outlets of the air conditioning device to openings which are located in the main air ducts. Because of the external and internal dimensions of the vehicle which are always limited, the space between the underside of the air conditioning device on which the air outlets are located and the upper sides of the main venting ducts is very small. This small space results in the cross sections of the air feed ducts being limited and as a result there are generally high flow speeds of the air, which in turn generate a high level of noise. This relates to vehicles in which the heating power from the air conditioning device which is conceived as a roof-mounting device is introduced into the passenger compartment via at least one separated-off duct which runs longitudinally in the roof area. The heating air duct is therefore separated off from the cold air duct. Different volume flows for the heating air and cooling air are necessary for different climatic zones. This is problematic for a vehicle which is to be operated in regions with different climates since even higher air speeds would occur in certain climatic zones.

The document DE 101 49 594 A1 is concerned with the previously described problems and provides the largest possible embodiment of the cross sections for the air conditioning ducts, in which case the air conditioning ducts are additionally assigned static functions and as a result installation space for load bearing elements is saved. However, when the cross section is divided into two fixed areas the utilization of the cross section is defined and therefore does not permit the optimum flow speeds when a component duct is not used.

SUMMARY OF INVENTION

The invention is based on the object of eliminating the indicated disadvantages of the prior art, that is to say, in particular, of providing in the easiest possible way an air duct system which, with division of the roof air duct into separate cross sections for warm air and cold air, gives rise to optimum flow speeds for variable volume flows of the warm air and cold air with a low generation of noise. In this context, the space required for the air duct system is to be as small as possible with regard to the installation spaces which are always restricted in vehicles.

This object is achieved according to the invention by means of an air duct system having the characterizing features of the claims. According to the principle of the invention, the component air duct for warm air and the component air duct for cold air are separated from one another in a variable fashion. The separation which is provided for this purpose and is either of deformable design or is held in a movable fashion enlarges, by virtue of the air pressure and volume flow conditions of the component air duct which is being acted on, the available cross section of this duct which is being acted on, by forcing into the component air duct which is not being acted on. This is done without additional auxiliary energy.

The advantages of the invention lie in particular in the fact that the cross section of the component air duct which is being acted on is, as it were, enlarged automatically and without supplying auxiliary energy. As a result, the flow speed and the generation of noise drop. It is therefore possible, for example, to use the same duct cross section in vehicles for different climatic zones for which cross sections of the ducts for warm and cold air which are larger per se would be necessary or else higher flow rates and a greater degree of generation of noise would have to be accepted. As a result, the costs for design, mounting and logistics drop, while in addition, all customer requirements can be met in a flexible way.

Advantageous embodiments and developments of the invention are specified in the subclaims.

BRIEF DESCRIPTION OF THE DRAWINGS

The invention will be described in more detail below with reference to two exemplary embodiments which are each illustrated in the drawing in a basic fashion.

FIGS. 5 and 6 shows cross sections which are supplementary to FIG. 4.

DETAILED DESCRIPTION OF INVENTION

Figure 1:
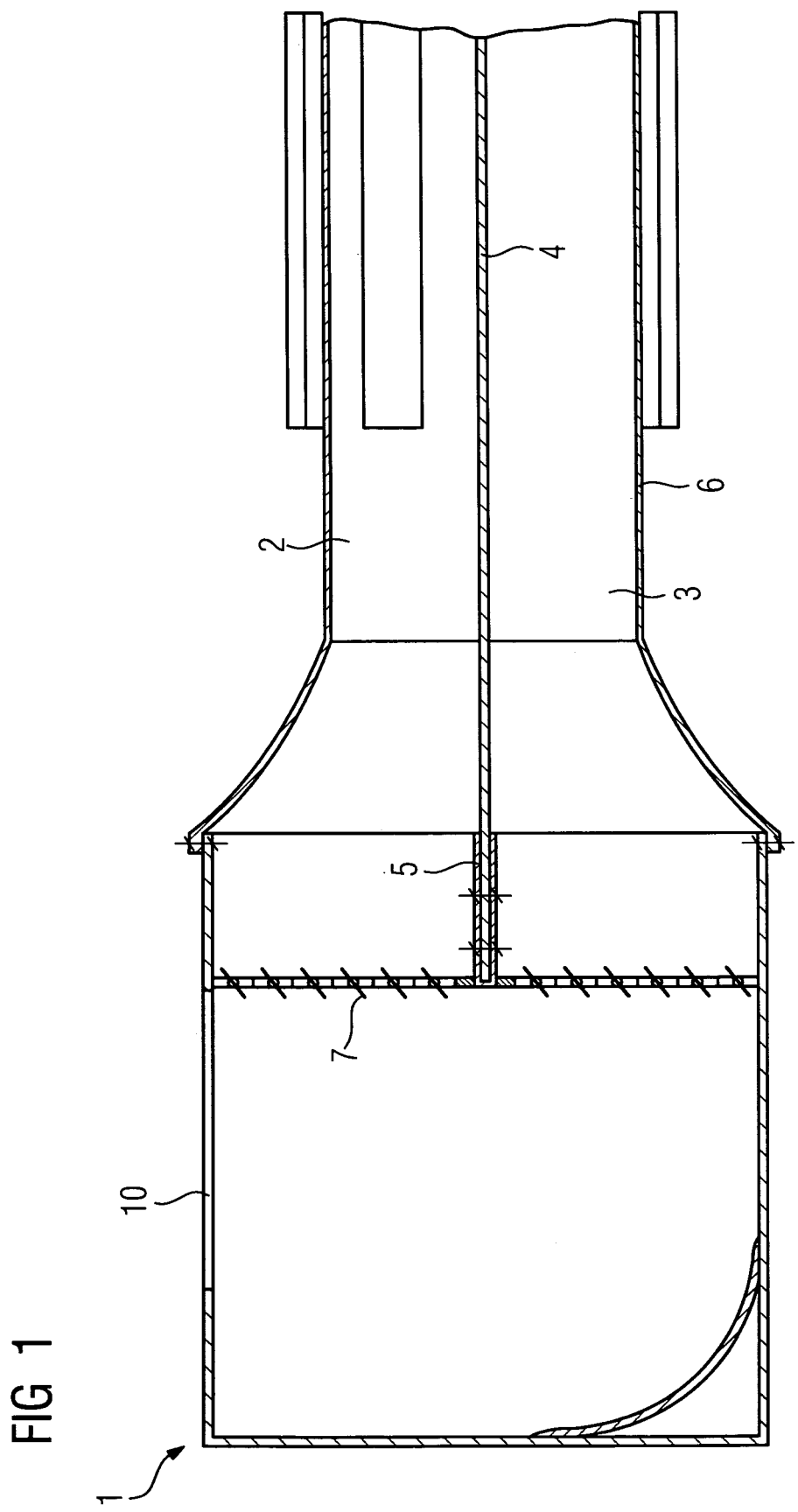
FIG. 1 shows a longitudinal section through an air duct system in which textiles are predominantly used.

The air feed is blown out by an air-conditioning device (not illustrated here) and is intended to pass into the passenger compartment via an air duct system which is arranged in the roof area of the vehicle. According to FIGS. 1 and 4, for this purpose this air is firstly fed to a roof venting duct 1 via an air inlet 10 and is conducted by means of adjustable flaps 7 into a component venting duct 2 for warm air and/or into a component venting duct 3 for cold air. FIG. 1 illustrates the possibility of setting the flaps 7 in such a way that both component venting ducts 2 and 3 are supplied with air. In the exemplary embodiment according to FIG. 4, the flaps 7 are set in such a way that they clear the selected component venting duct 3 for cold air and close the component venting duct 2, which is not acted on, for warm air.

Figure 2:
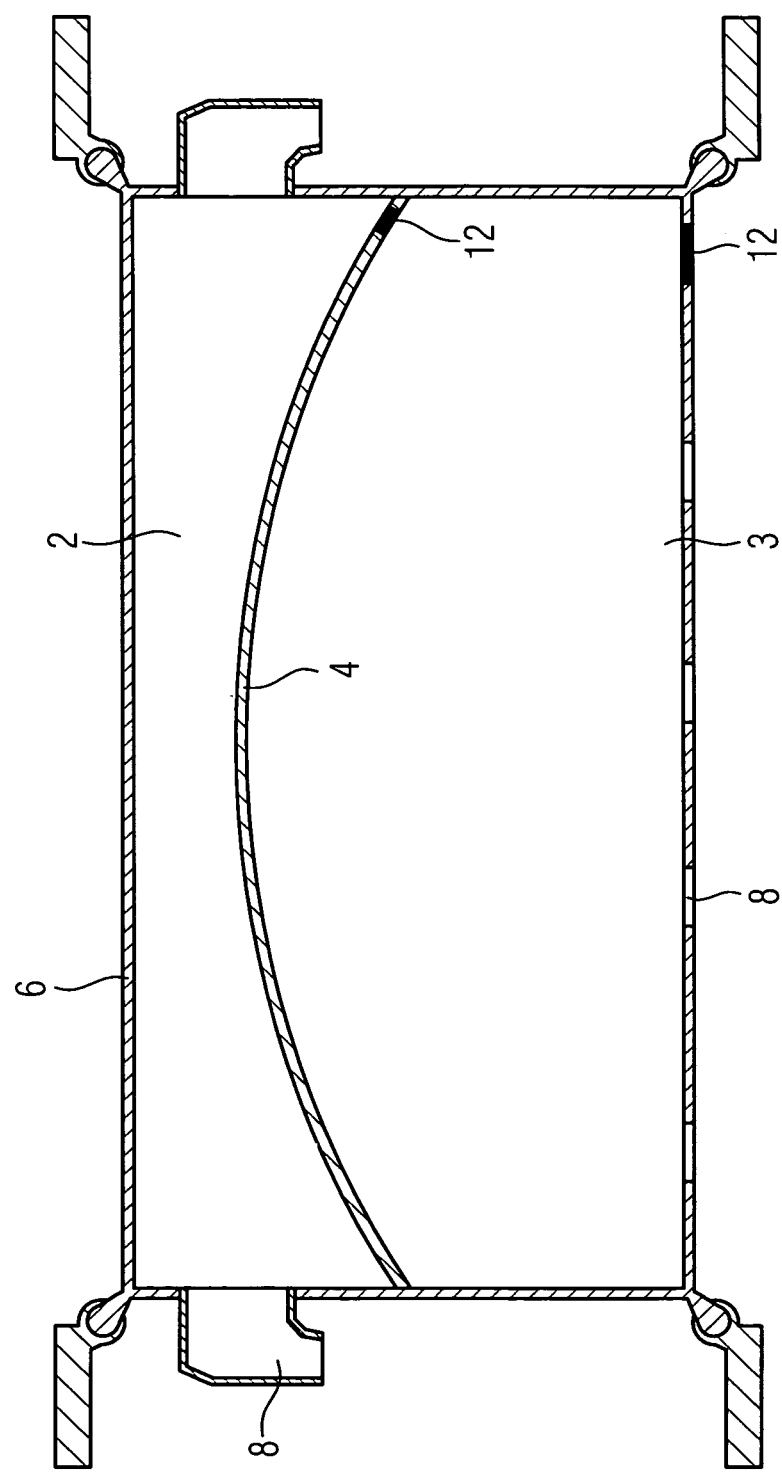
FIGS. 2 and 3 each show cross sections of the air duct system according to FIG. 1.
Figure 3:
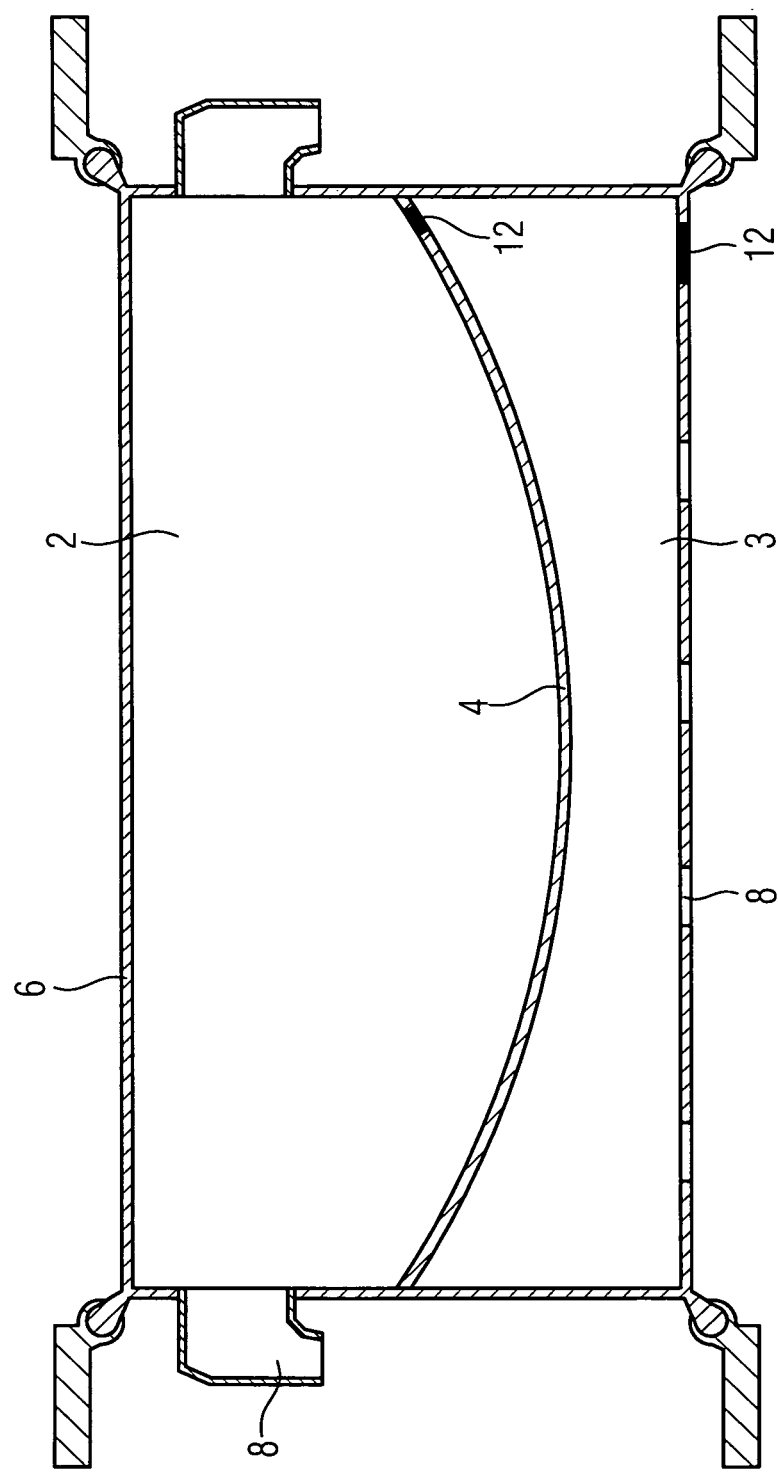

The air duct system according to FIGS. 1, 2 and 3 contains on the inside a deformable separating means 4 which is embodied as an airtight textile separating wall. This separating means 4 extends through the entire roof venting duct 1 and is attached to a fixed inner separating wall 5 which can simply be formed from a piece of sheet metal. Furthermore, the inner textile separating means 4 is attached to the side edges of an outer duct 6 which is associated with the roof venting duct 1, which can also be formed by textile webs and which has air outlets 8. In this case, it is possible to connect the textile separating means 4 to the outer duct 6 by means of seams or by means of crimped joints. It is recommended that the outer textile duct 6 and the textile separating means 4 be provided with zip fasteners 12 which permit easy access for cleaning purposes. The zip fasteners 12 themselves can be protected against dirt by means of strips which are sewn on above the zip fasteners 12.

The air pressure and volume conditions bring about deformation of the inner textile separating means 4 due to the pressure difference which arises, as a result of which the cross section of a component venting duct 2 or 3 is enlarged while the other component venting duct 3 or 2 becomes smaller. The textile separating means 4 is therefore deformed into the component venting duct 2 or 3 which is not acted on by air, as is apparent from FIGS. 2 and 3.

Figure 4:
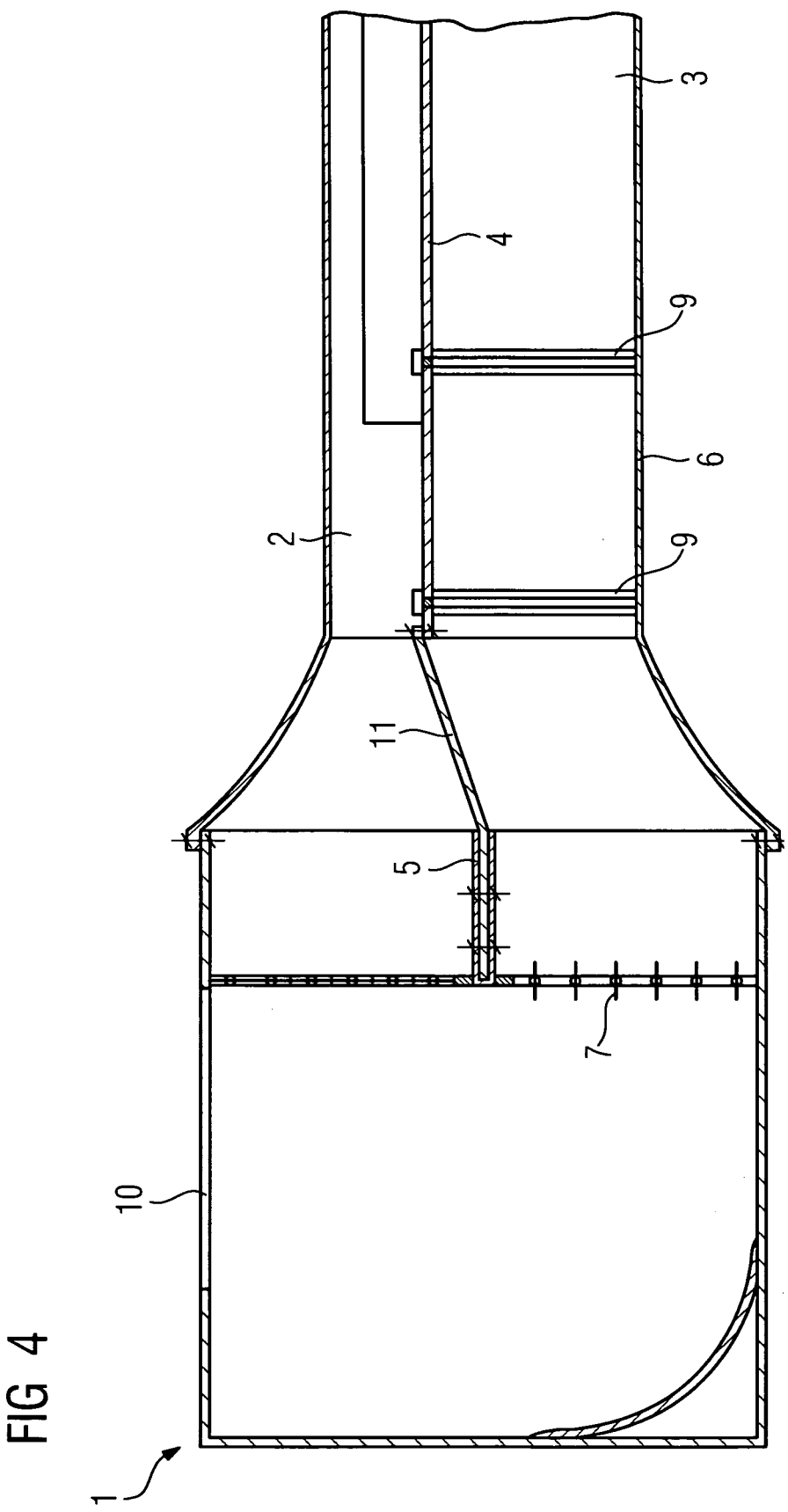
FIG. 4 shows a longitudinal section of an air duct system in which predominantly pieces of sheet metal are used.

The air duct system which is shown in FIGS. 4, 5 and 6 has, in contrast to what has been described above, an outer duct 6 which is formed from pieces of sheet metal or other dimensionally stable materials and an inner separating means 4 which is of plate shaped design and cannot deform. This separating means 4 can also be composed of a piece of sheet metal. The sheet-metal separating means 4 is arranged so as to be vertically movable with respect to the outer duct 6 by means of guides 9 and is held in its horizontal position. The sealing of the sheet-metal separating means 4 with respect to the outer duct 6 is done, for example, by means of rubber seals. A movable separating means 11 made of a deformable material (such as textile, rubber or leather) is attached on the one hand to the fixed inner separating wall 5 and, on the other hand, to the sheet-metal separating means 4. The movable separating means 11 therefore provides the junction between the fixed inner separating wall 5 and the vertically movable sheet-metal separating means 4 and follows its movements. The sealing of the movable separating means 11 with respect to the outer duct 6 is achieved, in particular, by means of the intrinsic stiffness of the movable separating means 11 which prevents its deformation. Rods made of metal or plastic can be inserted as a means of support into the separating means 11.

By virtue of the pressure conditions and the volume flow conditions between the two component venting ducts 2 and 3, the sheet-metal separating means 4 is pushed into the component venting duct which is not acted on and therefore enlarges the cross section of the component venting duct which is acted on by air, as is shown in FIGS. 5 and 6.

The invention claimed is:

1. An air duct system for rail passenger traffic vehicles, comprising: a roof venting duct having
   a first component venting duct for warm air;
   a second component venting duct for cold air;
   a separating device arranged inside the roof venting duct between the first and second component venting ducts, wherein the separating device is a linearly movable and rigid plate-shaped device so that one of the first or second component venting ducts is enlargeable by making the first and second other component venting duct smaller, wherein slidable movement of the plate-shaped structure and the resulting changes in cross section are brought about solely by the air pressure and volume flow condition within the roof venting duct without external energy; and
   a plurality of adjustable flaps positioned at an inlet of the first component venting duct for warm air and at an inlet of the second component venting duct for cold air, wherein the adjustable flaps are switchable between a first position in which air is configured to pass into both of the the first or second component venting ducts, and a second position in which air is configured to pass into one component venting duct and the adjustable flaps are configured to prevent the passage of air into the other first or second component venting duct.

2. The air duct system as claimed in claim 1, comprising a further separating device which is deformable.

3. The air duct system as claimed in claim 2, wherein the movable separating device is attached to a fixed, inner separating wall of the roof venting duct.

4. The air duct system as claimed in claim 1, wherein the plate shaped separating device is composed of a piece of sheet metal.

5. The air duct system as claimed in claim 1, wherein the plate shaped separating device is arranged so as to be vertically movable with respect to an outer duct of the roof venting duct via guides and is held in its horizontal position, where the outer duct is formed from pieces of sheet metal or other dimensionally stable materials.

6. The air duct system as claimed in claim 5, wherein the plate shaped separating device is connected to a movable separating device made of deformable material, wherein the movable separating device is attached to a fixed inner separating wall of the roof venting duct.

* * * * *